United States Patent Office 3,015,581
Patented Jan. 2, 1962

3,015,581
RAPID DRYING OF ADHESIVE AND CLAY
COATINGS ON FIBROUS BACKINGS
Robert Gallino, Flushing, N.Y., and Kenneth Thompson,
Woodcliff Lake, N.J., assignors to Lowe Paper Company, Ridgefield, N.J., a corporation of New Jersey
No Drawing. Filed July 7, 1959, Ser. No. 825,418
9 Claims. (Cl. 117—119.6)

This invention relates to an improved process for applying adhesive and clay containing liquid coating compositions and to the products made by this process.

A simplified flow diagram of the process is as follows:

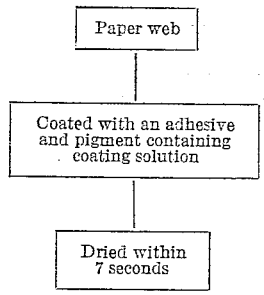

Clay coatings are applied to paper and paperboard products for both decorative and utility value. These coatings provide a smooth, bright surface on which it is possible to obtain better reproduction by all of the printing processes. Therefore, such factors as brightness, gloss and ink receptivity are of major importance in the manufacture and use of clay coated products.

In clay coating paper and paperboard products the most expensive ingredients are adhesives and opaque white pigments. Conventional clay coatings used in the printing and packaging industries usually contain between 15% and 20% adhesive based on the total dry weight of clay and pigment. This amount of adhesive has been found to be necessary to provide sufficient bond to the substrate to withstand the stresses encountered in the use of the product. For example, clay coatings must withstand handling, scuffing, printing, folding, scoring, gluing and other similar processes.

Since all of the known adhesives for clay coatings are to a greater or lesser degree resistant to oils, increasing the adhesive content decreases the ink receptivity. In addition to this, as the percent adhesive is increased the refractive index of the coating is changed so as to make the coating more transparent. This then necessitates the use of bright opaque pigments which are expensive. The adhesives generally used are casein, soya protein, starch, polymer emulsions such as acrylics, vinyl acetates and styrene butadiene.

It is an object of the present invention to provide a process for coating a backing with an adhesive and clay containing liquid coating composition which affords considerable saving in the adhesive employed.

It is another object of the present invention to provide a clay and adhesive coated backing of improved gloss rating.

It is a further object of the present invention to provide a clay and adhesive coated fibrous backing having improved gloss rating and ink reception.

It is also an object of the present invention to provide an economical process for producing a clay and adhesive coated fibrous backing having improved gloss rating and ink reception.

Other and more detailed objects will be apparent from the following description and claims.

We have discovered a method of making clay coatings which materially reduces the adhesive requirement and consequently results in higher brightness, greater ink receptivity and lower cost. In addition, coatings made by this process have a higher gloss than conventional clay coatings. The essential feature of this invention is that the coating be dried within a maximum of seven seconds after application to the substrate. One way this can be accomplished is by applying intense heat to the web immediately after the coating has been applied. Since the rate of drying is related to the percent solids of the coating mixture, higher solid content coatings can be dried more quickly. In such cases it is possible to reduce the intensity of heat applied. The important point is that the drying be accomplished within seven seconds. However, in general it may be stated that the temperatures employed in the drying step will fall in the range of about 200° F. to 5000° F. Preferred 3000–5000° F. coatings thus dried can be made with an adhesive content of less than 12% based on the dry clay and pigment. Suitable coatings have been made with as little as 5% adhesive by drying within three seconds. Thus a suitable range for adhesive content may be expressed as about 5% to 12% based on the dry clay and pigment. It seems that the rapid drying prevents preferential drainage of adhesives into the base paper; therefore, maintaining a strong adhesive layer between the upper fibers of the substrate and the clay coating making it possible to obtain sufficient bond with appreciably less adhesive.

The penetration of adhesive can be reduced to some extent by base coating with a clay-adhesive combination. In such cases, where the paper has been base coated the adhesive requirement of the second coat can be reduced.

The improvement in gloss of coatings made by our process is a result of at least two factors. Firstly, the quickly dried coating does not have sufficient time to flow and conform to the contours of the base paper—therefore, it is smoother. Secondly, coatings with a low adhesive content can be polished more readily in standard finishing operations such as calendering, brushing, etc. For example, a coating dried in 3.7 seconds had a 75° gloss of 48 compared to a gloss of 32 for the same coating dried in more than one minute.

In a preferred form of this invention the coating is dried from the back of the web by means of a gas flame from a ribbon burner. In using the ribbon burner as a means of drying, the web is passed directly through the hottest portion of the flame. Other methods of drying will be obvious to those skilled in the art such as high velocity hot air, radiant electric heat, high frequency dielectric field, steam dryer, etc.

Drying from the back produces a coating with greater ink receptivity than coatings dried from the face. This is desirable for printing papers. For example, the following table shows the difference in ink receptivity as measured by the K and N stain test for the same coating dried in different ways.

|  | K and N |
| --- | --- |
| Festoon dried | 42 |
| Rapid drying-back of sheet, 3.7 seconds | 42 |
| Rapid drying-directly on web coating, 3.7 seconds | 7–9 |

It should be noted, however, that where grease resistance is important a substantial reduction in grease absorption can be obtained by drying the coating from the face.

The following examples are further illustrative of the present invention and it will be understood that the invention is not limited thereto.

EXAMPLE 1

| Kaolin clay | 100 parts. |
|---|---|
| Casein | 8 parts. |
| Wt. coat | 4–6# clay/rm. (22 x 28/500). |
| Percent solids | 46.9% solids. |
| Coating method | Air knife. |
| Drying time | 4.6 seconds. |
| Drying method | Gas burner (3400° F.). |
| Finishing operation | Board machine, steel calender. |

*Comparison of results*

EXAMPLE 1

|  | 8% Adhesive Coating | A* |
|---|---|---|
| Gloss (75°) | 75 | 50 |
| Fold: |  |  |
| MD | good | good |
| CD | good | good |
| Dennison Wax Pick | 11 | 10 |
| K and N Ink Test | 45 | 40 |
| Gluability: |  |  |
| Resin | OK | OK |
| Dextrin | OK | OK |

A*—A standard off machine air knife coating having an adhesive content of 18% and festooned dried for 3–5 minutes at 125° F.

EXAMPLE 2

| Kaolin clay | 100 parts. |
|---|---|
| Soya protein | 8 parts. |
| Wt. coat | 4–6# clay/rm. (22 x 28/500). |
| Percent solids | 46.9% solids. |
| Coating method | Air knife. |
| Drying time | 4.6 seconds. |
| Drying method | Gas burner (3400° F.). |
| Finishing operation | Board machine, steel calender. |

*Comparison of results*

EXAMPLE 2

|  | 8% Adhesive Coating | A* |
|---|---|---|
| Gloss (75°) | 75 | 50 |
| Fold: |  |  |
| MD | good | good |
| CD | good | good |
| Dennison Wax Pick | 11 | 10 |
| K and N Ink Test | 45 | 40 |
| Gluability: |  |  |
| Resin | OK | OK |
| Dextrin | OK | OK |

A*—A standard off machine air knife coating having an adhesive content of 18% and festooned dried for 3–5 minutes at 125° F.

EXAMPLE 3

FORMULATION

| Kaolin clay | 80 parts. |
|---|---|
| TiO₂ | 20 parts. |
| Acrylic | 8.5 parts. |
| Casein | 1.0 part. |
| Wt. coat | 4–6# clay/rm. (22 x 28/500). |
| Percent solids | 65%. |
| Percent adhesive | 9.5% total. |
| Coating method | Champion coater. |
| Drying time | 4.2 seconds. |
| Drying method | High velocity hot air 7000 ft./min. (350° F.). |
| Gloss (75°) | 85. |
| Finishing operation | Chromium plated molding calender. |

EXAMPLE 4

FORMULATION

| Kaolin clay | 100 parts. |
|---|---|
| Styrene butadiene | 1.8 parts. |
| Casein | 3.6 parts. |
| Protein | 3.6 parts. |
| Wt. coat | 3–4# clay/rm. (22 x 28/500). |
| Percent solids | 38.4%. |
| Percent adhesive | 9.0% total. |
| Coating method | Air knife. |
| Drying time | 3.5 seconds. |
| Drying method | Gas burner (3400° F.). |
| Gloss (75°) | 50–55. |
| Finishing operation | Supercalender. |

EXAMPLE 5

FORMULATION

| Kaolin clay | 100 parts. |
|---|---|
| Soya protein | 5 parts. |
| Wt. coat | 6–7# clay/rm. (22 x 28/500). |
| Percent solids | 60%. |
| Percent adhesive | 5.0% total. |
| Coating method | Champion. |
| Drying time | 2.1 seconds. |
| Drying method | Gas ribbon burner. |
| Gloss (75°) | 80. |
| Finishing operation | Supercalender. |

EXAMPLE 6

The following base coat formulation was applied by air knife and tunnel dried for 30 seconds at 150° F.

| Kaolin clay | 100 parts. |
|---|---|
| Soya protein | 14.4 parts. |
| Styrene butadiene | 1.8 parts. |
| Acrylic | 1.8 parts. |
| Wt. coat | 4# clay/rm. (22 x 28/500). |
| Percent solids | 38%. |
| Percent adhesive | 18.0%. |
| Coating method | Air knife. |
| Drying time | 30 seconds. |
| Drying method | Tunnel dryer 150° F. |
| Finishing operation | Uncalendered. |

The following low-adhesive formulation was coated on the above-mentioned base coat employing the rapid drying technique:

| Kaolin clay | 100 parts. |
|---|---|
| Polyvinyl acetate | 6 parts. |
| Casein | 1 part. |
| Wt. coat | 7# clay/rm. (22 x 28/500). |
| Percent solids | 60%. |
| Percent adhesive | 7.0%. |
| Coating method | Air knife. |
| Drying time | 2.7 seconds. |
| Drying method | Gas burner (3400° F.). |
| Gloss (75°) | 90. |
| Finishing operation | Chrome roll supercalender. |

On non-base coated stock, the above coating required 9.5% adhesive.

While the invention has been described with particular reference to specific embodiments, it is to be understood that it is not limited thereto but is to be construed broadly and restricted solely by the scope of the appended claims.

What is claimed is:

1. In the process for applying an adhesive and clay containing liquid coating composition to a fibrous backing, the improvement which comprises rapidly drying said coating composition on said backing within seven seconds after the application of said coating composition the adhesive content of said coating composition being less than about 12% based on dry clay and pigment contained in the coating composition.

2. A process according to claim 1 wherein the drying temperature employed is in the range of about 200° F. to 5000° F.

3. A process according to claim 1 wherein the adhesive content of said coating composition is in the range of about 5% to 12% based on the dry clay and pigment.

4. A process according to claim 1 wherein said rapid drying is effected by passing said coated backing through the hottest portion of an open flame.

5. A process according to claim 1 wherein said rapid drying is effected by means of high velocity hot air impingement.

6. A process according to claim 1 including the step of applying a base coating containing clay and adhesive prior to the application of said liquid coating composition.

7. A process according to claim 1 wherein said coating is rapidly dried by applying the heat to the uncoated surface of said coated fibrous backing.

8. A process according to claim 1 wherein said coating is rapidly dried by applying heat to the coated surface of said coated fibrous backing.

9. A product made by the process of claim 1.

References Cited in the file of this patent

UNITED STATES PATENTS

| | | |
|---|---|---|
| 1,857,497 | Clapp | May 10, 1932 |
| 2,176,981 | Smith et al. | Oct. 24, 1939 |
| 2,617,743 | Grimm | Nov. 11, 1952 |
| 2,884,705 | Flynn | May 5, 1959 |
| 2,955,958 | Brown | Oct. 11, 1960 |